Dec. 25, 1962     W. C. RIESTER     3,070,184
VEHICLE DOOR LOCKING SYSTEM
Filed June 11, 1959     2 Sheets-Sheet 1
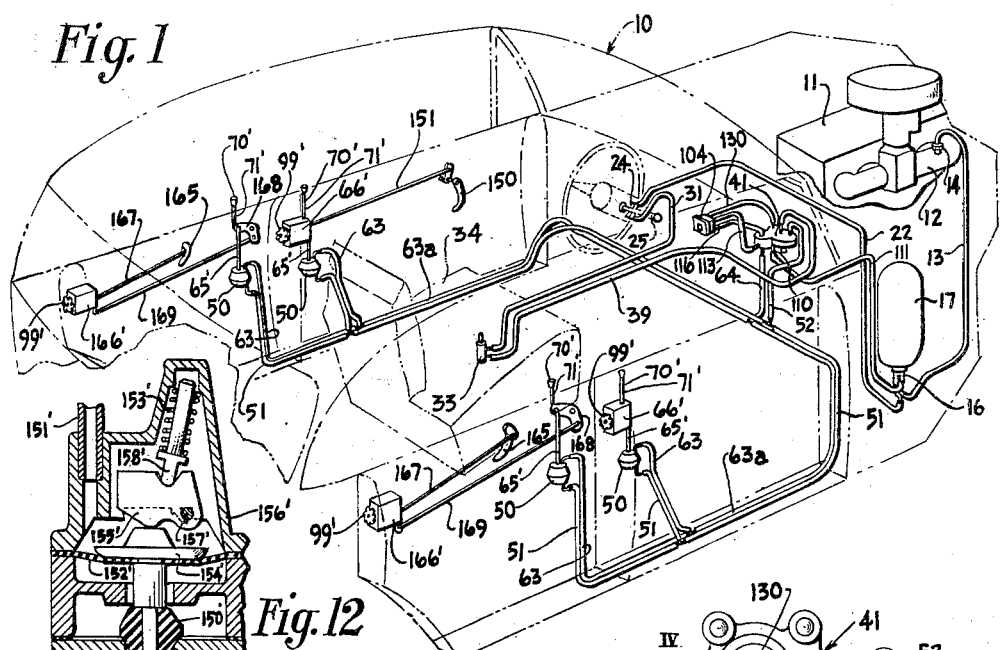
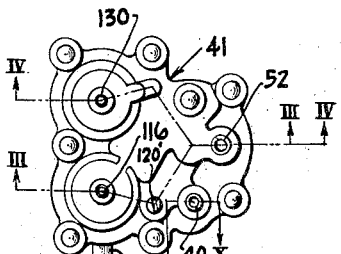
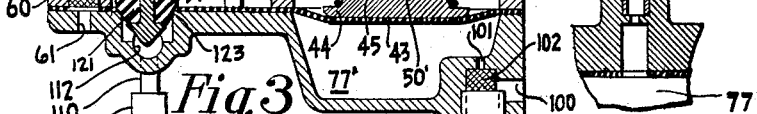
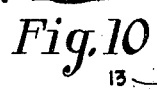
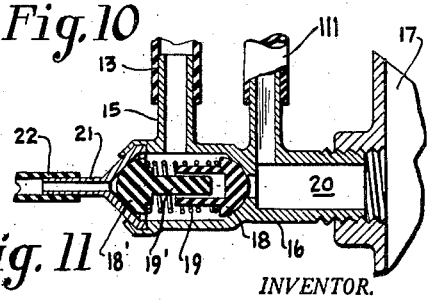
INVENTOR.
WILLIAM C. RIESTER
BY
Beau Brooks Buckley & Beau
ATTORNEYS Dec. 25, 1962 W. C. RIESTER 3,070,184
VEHICLE DOOR LOCKING SYSTEM
Filed June 11, 1959 2 Sheets-Sheet 2
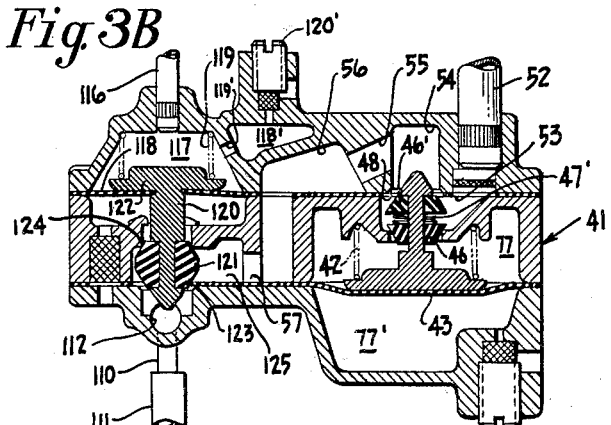
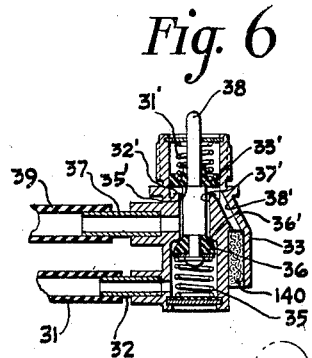
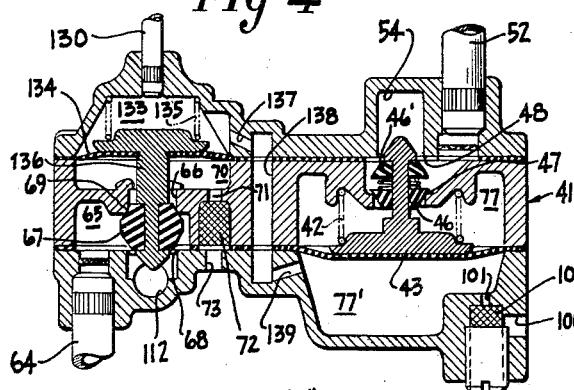
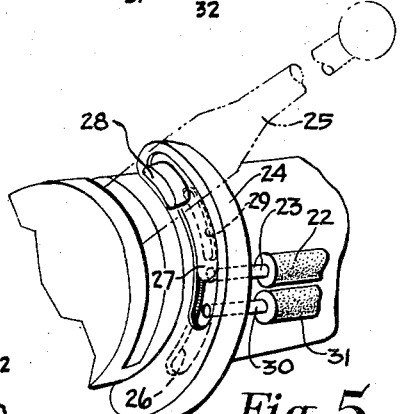
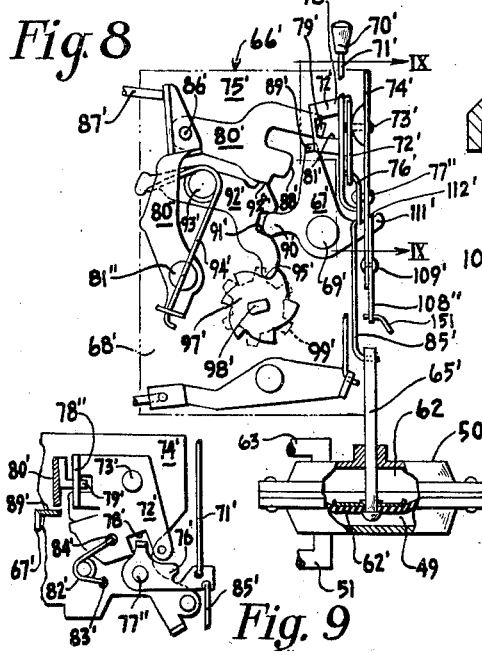
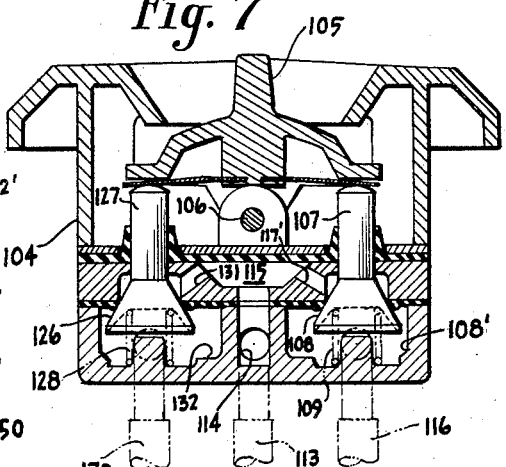
INVENTOR.
WILLIAM C. RIESTER
BY
Bean Brooks Buckley + Bean
ATTORNEYS

United States Patent Office 3,070,184
Patented Dec. 25, 1962

3,070,184
VEHICLE DOOR LOCKING SYSTEM
William C. Riester, Williamsville, N.Y., assignor to
Trico Products Corporation, Buffalo, N.Y.
Filed June 11, 1959, Ser. No. 819,675
6 Claims. (Cl. 180—82)

The present invention relates to an improved automatic door locking system for an automotive vehicle.

It is one object of the present invention to provide an improved automatic locking system for a automotive vehicle which, incidental to the normal operation of the vehicle, not only automatically locks all vehicles doors against unauthorized instrusion from outside of the vehicle but also maintains certain of the vehicle doors, preferably those in the rear, in a locked condition against unauthorized opening from within to prevent accidental door openings while the vehicle is in motion.

Another object of the present invention is to provide a locking system as described above wherein an arrangement is provided which positively prevents a vehicle against unauthorized intrusion from outside of the vehicle incidental to the operation of the automatic locking arrangement.

A further object of the present invention is to provide a system of the above-described type which is economical in both construction and operation inasmuch as it is fluid pressure actuated by an engine by-product, namely, manifold vacuum, and which provides positive locking of the vehicle doors for the above-described purposes regardless of fluctuations in manifold vacuum or even the complete absence thereof after the locks have once been actuated to a locked condition.

Yet another object of the precent invention is to provide an automatic door locking system of the above-described type in which a manual remote-locking arrangement is provided for permitting the vehicle operator to manually supersede the action of the automatic locking arrangement, as desired.

A still further object of the present invention is to provide an improved valve structure for providing prompt positive operation of the door locking system. Other objects and attendant advantages of the present invention will be more readily perceived hereafter.

The present invention protects the occupants of a vehicle because it not only provides automatic locking of all of the vehicle doors against unauthorized entry from outside, but also causes locking of certain of the doors against opening by occupants within the vehicle to prevent accidental door openings while the vehicle is in motion.

In accordance with the present invention, in a vehicle of the four-door type, the rear door latch locks are preferably of the type which will not unlatch the vehicle doors when the inside door handles are actuated when the locking pin or push button in the door molding is in a depressed condition. The front door latch locks may be of the type which will permit unlatching of the vehicle doors by the inside door handles, even when the push buttons or locking pins are depressed. However, both types of locks prevent opening of the vehicle doors from outside of the vehicle when the doors are locked.

In accordance with one aspect of the present invention, a fluid pressure door locking motor is associated with each latch lock. During an initial phase of vehicle operation, each motor is automatically placed in communication with the engine intake manifold whereby the doors are automatically locked against opening from the outside. The fluid pressure motors which actuate the rear door locks exert a holding force against the rear door locking pins all of the time while the vehicle is occupied by the driver, whether the vehicle is moving or at a standstill, thereby preventing children, or other occupants, in the rear of the vehicle from lifting the door locking pins or push buttons and turning the inside door handles to open the doors. Because of the foregoing arrangement, the operator is assured that children in the rear of the vehicle will not open the rear doors while the vehicle is in operation. However, if desired, the vehicle operator may leave the vehicle through the front door while the door locking motors are energized because the linkage actuated by the inside front door handle will override the force exerted by the motor on the latch lock.

The fluid pressure circuit which causes communication between all of the door locking motors and the engine intake manifold includes a first valve adapted to be opened only when the vehicle drive selector is in a forward drive position, a second valve adapted to be opened only when a person is occupying the driver's seat, a central distributor valve, and a check valve. The drive selector valve presents the passage of fluid therethrough when the vehicle drive selector is in a neutral or parked position, which it occupies immediately after the engine is started. Therefore, assuming that the vehicle doors were unlocked when the engine was started, they will not be locked by the automatic action of the locking system until the vehicle drive selector is placed in a forward drive position, and, therefore, prior to this action, other passengers will be able to open the vehicle doors from outside in order to enter. Once the drive selector is moved to a forward drive position while the operator's seat is being occupied and while the engine is in operation, there will be communication between the engine intake manifold and the door locking motors through the above-mentioned four elements and associated conduits to effect an automatic door locking action which locks all of the doors against unauthorized intrusion from the outside and locks the rear doors of the vehicle against unauthorized opening from within.

The check valve mentioned above is provided for the purpose of trapping vacuum in the door locking motors during periods of low manifold vacuum, as occurs during vehicle acceleration. Thus, under foregoing condition, even though there may not be enough manifold vacuum to enable the motors to maintain a satisfactory holding force against the door locking push buttons in the rear doors, the fact that high vacuum is trapped in the door locking motors by the check valve prevents the manipulation of the push buttons or locking pins to an unlocked position. Thus a force is always maintained on the locking pins in the rear doors while the vehicle is in operation to prevent opening of the rear vehicle doors.

It will readily be appreciated that when the vehicle engine is stopped, the above-mentioned check valve will ordinarily trap vacuum in the above-described manner to prevent opening of the rear vehicle doors from within the vehicle. However, to overcome this, the seat valve is arranged so that when the operator raises himself therefrom, as in leaving the vehicle, the rear door locking motors will be vented to permit people within the vehicle to unlock the rear locks and to open the rear doors. In addition, if the drive selector is moved to out of a forward drive position, as it should when passengers enter or leave the vehicle, the rear locking motors will be vented to permit the locking pins to be moved to an unlocking position.

Furthermore, as noted above, when the seat valve is closed (when the operator's seat is unoccupied), it will prevent communication between the vacuum source and the door locking motors. Thus, when the vehicle operator leaves the vehicle while the engine is in operation and the drive selector is in a forward drive position, the fact that the seat valve is closed will prevent the front door locks from being relocked after they are opened by the manipulation of the inside door handle. Therefore, the vehicle operator cannot be locked out of the vehicle in response to the operation of the automatic locking system.

In addition to the foregoing, a manual remote locking and unlocking arrangement is provided for the convenience of the vehicle operator. A remote control may be placed on the dashboard, but is preferably located on the operator's door, and a similar control may also be placed on the front passenger's door. The manipulation of this control will cause communication between a vacuum storage tank and the door motors through the central distributor valve for the purpose of providing selective locking or unlocking of the vehicle doors. For example, if an operator enters the vehicle and desires to be assured that all of the doors are locked, he may manipulate the control to effect locking the vehicle doors, whether or not the vehicle engine is in operation. Furthermore, in the event that the vehicle engine is in operation, but the drive selector has not yet been moved to a forward drive position, the manipulation of the remote control will cause the door locking motors to be locked. In the event that the vehicle operator desires to unlock any of the vehicle doors, including the rear doors, from within the vehicle, he need merely manipulate the remote control to an unlocked position to cause the door locking motors to effect an unlocking operation. In this respect, it is to be noted that in an unlocking operation, the action of the remote manual control supersedes the automatic locking action described above because of the inherent action of the above-mentioned central distributor valve. A time delay is provided by the central valve to permit the operator to actuate the unlocking control momentarily and cause the door locking motors to exert an unlocking force on the door locks for a few seconds interval in order to permit a passenger to open the doors. This delay action obviates the requirement for the operator to hold the unlocking button during the door opening operation. If the vehicle engine is in operation, the door locks will be automatically returned to a locked condition after the expiration of a few seconds interval. One embodiment of the improved central distributor valve includes a rapid acting valve mechanism which insures prompt, positive communication between the door locking motors and the vacuum tank whenever the manual control is actuated. In this respect, the valving arrangement within the central distributor valve requires less force to be maintained in an open position than in a closed position. Therefore, whenever remote manual actuation of the door locking motors is desired, as soon as the control is actuated, the central distributor valve will positively open to provide full communication between the vacuum tank and the door locking motors.

In addition to all of the foregoing, both the front door and rear door latch locks are of the type which will remain in the condition in which they were last placed prior to opening of the vehicle doors. Thus, since all of the doors are always automatically locked incidental to the normal operation of the vehicle, the vehicle operator need only relock those doors which were used in leaving the vehicle. If all four doors are to be used in leaving the vehicle, the operator need merely wait until all but the driver's door have been closed after use, and then manipulate the remote control to place all of the door locks in a locked condition. Thereafter, the only door which need be locked from the outside will be the door through which the operator leaves.

It can thus be seen that a vehicle door locking system is provided which automatically produces locking of all the vehicle doors against intrusion incidental to the normal operation of the vehicle; which maintains the rear doors of the vehicle locked against opening from within to safeguard children from the results of opening the door of a moving vehicle; which, in addition to giving the foregoing action, prevents an operator from being locked out of the vehicle; which provides a system of manual control which overrides the automatic action of the system to permit the vehicle operator to lock or unlock any of the vehicle doors at will; and which only requires the vehicle operator to manually lock the door through which he leaves in order to provide complete locking of the vehicle when it is parked.

The present invention will be more fully understood when the following portions of the specification are read in conjunction with the accompanying drawings wherein:

FIG. 1 is a fragmentary perspective view of an automotive vehicle containing the improved door locking system of the present invention;

FIG. 2 is a plan view of the central distributor valve utilized in the door locking system of the present invention;

FIG. 3 is a view, taken substantially along lines III—III of FIG. 2 showing, partially in cross-section, the central distributor valve of the present invention in a neutral position;

FIG. 3A is a view taken along line III—III of FIG. 2, but showing the distributor valve in the position which it assumes when manifold vacuum is maintaining the door locking motors of the vehicle in a locked condition;

FIG. 3B is a view, taken along line III—III of FIG. 2, showing the position which the distributor valve assumes when the door locking motors are manually actuated to a locking condition from a remote position;

FIG. 4 is a view, taken along line IV—IV of FIG. 2 showing the central distributor valve in the position which it assumes when the door locking motors are manually actuated to an unlocked condition from a remote position;

FIG. 5 is a fragmentary perspective view of a valve associated with the drive selector of a vehicle, this valve permitting automatic actuation of the door locking motors only when the drive selector is in a drive position;

FIG. 6 is a view, partially in cross-section, of a seat valve which is adapted to permit communication between a vacuum source and the door locking motors for automatic actuation of the latter only when the vehicle operator is in position on the seat of the vehicle;

FIG. 7 is a fragmentary perspective view of the manual control valve which is utilized for actuating the door locking motors for unlocking or locking the vehicle doors from a remote position;

FIG. 8 is a view of the internal mechanism of the latch lock associated with each door and the fluid pressure motor associated therewith;

FIG. 9 is a view of the latch lock mechanism taken along line IX—IX of FIG. 8;

FIG. 10 is a view taken along line X—X of FIG. 2;

FIG. 11 is a view, partially in cross-section, showing a check valve associated with a vacuum tank mounted in the vehicle; and FIG. 12 is a view, partially in cross-section, of a modified construction which may be used in the central distributor valve.

In FIG. 1, an automotive vehicle 10 is shown having an engine 11 with the usual engine intake manifold 12 which produces a vacuum whenever the vehicle engine is in operation, as is well known in the art. This vacuum is used to automatically lock the vehicle doors by actuating fluid pressure door locking motors in the vehicle doors. To this end, a conduit 13 has one end thereof in communication with manifold 12 through fitting 14. The other end of conduit 13 is affixed to nipple 15 (FIG. 11) extending from check valve 16 associated with vacuum tank 17. In valve 16, check valves 18—18' (FIG. 11) are biased toward their seats by spring 19. Whenever the vacuum in conduit 13 leading from the manifold is greater than the vacuum in conduit 22, which ultimately communicates with the door locking motors, check valve 18' will be unseated against the bias of spring 19. In this respect, stem 19' of valve 18' rides in a bore within valve 18. Furthermore, valve 18 will be unseated against the bias of spring 19 to permit tank 17 to be evacuated by the action of the engine intake manifold through fitting 20. As is well known in the art, check valve 18 will prevent loss of vacuum from tank 17 whenever a predetermined differential exists between the pressures in tank 17 and conduit 13.

In order to prevent manifold vacuum from communicating with the door locking motors under certain circumstances when the vehicle is at a standstill with the engine idling, as when the vehicle operator is waiting for passengers to enter the vehicles, a valve controlled by the vehicle gear selector is provided. Whenever the gear selector is in a "park" or neutral position, this communication will be prevented. In order to accomplish the foregoing, conduit 22 is coupled between nipple 21 of valve 16 and nipple 23 (FIG. 5) extending from gear selector valve housing 24 mounted proximate the vehicle drive selector 25 (FIG. 1). Slidably mounted within groove 26 of selector valve housing 24 is a valve element 27. A protuberance 28, extending from valve element 27, is adapted to be engaged by a mating aperture (not shown) in the under side of the drive selector 25 so that valve element 27 is moved in groove 26 whenever the drive selector 25 is manipulated. Whenever drive selector 25 is in a drive position for effecting forward movement of the vehicle, a groove 29 in valve element 27 will cause communication between nipple 23 (which is in communication with the intake manifold) and nipple 30 on which conduit 31 (FIGS. 1 and 5) is mounted. Whenever the vehicle drive selector is in a position other than forward drive, there can be no communication between the intake manifold 12 and the parts of the door locking system beyond gear selector valve because nipple 30 is vented to the atmosphere and the face of nipple 23 is blocked by the surface of valve element 27.

Automatic door locking can be effected only when the operator's seat is occupied. Conversely, when it is not occupied, there can be no automatic locking. Therefore, when the vehicle operator leaves the vehicle, the doors cannot automatically lock behind him. To achieve the foregoing, the other end of conduit 31 is coupled to nipple 32 extending from seat valve 33 (FIGS. 1 and 6), which is located underneath the seat 34 of the vehicle. Whenever seat 34 is unoccupied, spring 35 (FIG. 6) pushes poppet valve 36 upwardly against seat 36' to prevent communication between nipple 32 and nipple 37. However, whenever seat 34 is occupied, valve stem 38 is moved downwardly to permit communication between nipples 32 and 37. Furthermore, valve element 33' is moved onto seat 32' by spring 31' to prevent venting of conduit 39 through oversized valve stem bore 37', conduit 38', and filter 140. By the use of seat valve 33, communication between the manifold and the door locking motors is prevented whenever the operator is not in the vehicle, thereby preventing him from being locked out in the event he leaves the vehicle while the engine is in operation.

The automatic door locking is effected through a central distributor valve 41. A conduit 39 (FIGS. 1 and 6) has one end thereof coupled to nipple 37 and the other end thereof mounted on nipple 40 (FIGS. 2 and 10) extending from central distributor valve 41, which effects communication between the door locking motors and the vacuum source, as described in detail hereafter. Whenever the vehicle engine is not in operation, the elements of valve 41 will assume the position shown in FIG. 3. Under this condition, spring 42 causes flexible diaphragm 43 to assume its lowermost position, and disc 44, which is interposed between spring 42 and diaphragm 43, and which mounts valve stem 45, will cause poppet valve 46 to be seated on lower seat 47 and cause poppet valve 46' to be away from upper seat 48. When valves 46—46' are in the position shown in FIG. 3, locking chamber 49 (FIG. 8) of each door locking motor 50 (FIGS. 1 and 8) will be in communication with the atmosphere through conduits 51, conduit 52, (FIGS. 1, 2, 3, 3A, 3B, and 4), conduit 53 within valve 41, valve conduits 54, 55, 56, 57, 58, 59, filter 60, and aperture 61 in the valve housing. Furthermore, the unlocking chamber 62 (FIG. 8) of each motor 50 is also in communication with the atmosphere through conduits 63 and 63A, conduit 64 (FIGS. 1 and 4), chamber 65 (FIG. 4) of valve 41, conduit 66 (which is unobstructed because valve 67 is then seated on its lower seat 68 rather than its upper seat 69, as shown in FIG. 4), chamber 70, conduit 71, filter 72, and aperture 73 in the valve housing. Therefore, whenever vacuum is not being applied to valve 41, this condition being realized whenever the vehicle engine is not in operation, whenever the drive selector is not in a forward drive position, and whenever the locks are not being remotely controlled (as described in detail hereafter), the manual door locking and unlocking pins or push buttons 70' (FIGS. 1 and 8) may be manually moved to an unlocked or a locked position without interference from motors 50 to which said unlocking pins are connected through a linkage to be described in detail hereafter. Therefore, it will readily be seen that under the above-described circumstances the automatic door locking system will in no way interfere with conventional operation of the door locking pins 70' for effecting direct manual locking and unlocking of the door locks from within the vehicle.

One aspect of the present invention is to automatically effect locking of the vehicle doors when the vehicle engine is in operation to thereby safeguard the occupants of the vehicle against unauthorized intrusion when the vehicle comes to a stop and to also cause certain of the door locking motors to maintain a locking influence on the locks associated therewith, thereby preventing accidental openings of the vehicle doors, as by children, while the vehicle is in motion. In order to achieve the foregoing, whenever the vehicle engine is in operation and the vehicle operator is on the seat and the drive selector lever is in a forward drive position, there will be communication between the engine intake manifold and central control valve 41 through drive selector valve 24, seat valve 33, and the associated conduits, as described above. Therefore, manifold vacuum in conduit 39 leading from the seat valve (FIGS. 1 and 10) will be in communication with chamber 77 of valve 41 through nipple 40 (FIGS. 2 and 10). The existence of vacuum in chamber 77 (FIGS. 3 and 3A) will cause diaphragm 43 to be raised upwardly against the bias of spring 42 to the position shown in FIG. 3A from the position shown in FIG. 3. Chamber 77' below diaphragm 43 is vented to the atmosphere through ports 100 and 101 having a filter 102 therebetween, the filter being held in position by screw 103. The upward movement of diaphragm 43 will cause poppet valve 46' to be moved to its seat 48 and thereafter cause valve 46 to be moved off of its lower valve seat 47 (FIG. 3A). In this respect, it is to be noted that poppet valves 46 and 46' are loosely mounted on stem 45 and that spring 47' biases them away from each other. As diaphragm 43 is moved upwardly, spring 47' will maintain valve 46' in contact with shoulder 49' on stem 45, and valve 46' will engage seat 48 before shoulder 50' engages valve 46 and moves it away from its seat 47. The sequential valve action prevents cross-porting between chamber 77 and conduit 54 to provide fast valve operation. The split valve arrangement also prevents cross-porting when the valve is returned to the position shown in FIG. 3. After valve 46 is unseated, the vacuum in chamber 77 will be in communication with conduit 52 through the aperture surrounding valve seat 47 and chamber 53 of valve 41. As explained in detail above, conduit 52 (see FIG. 1) leads from the central distributor valve 41 and is in communication with conduits 51 leading to chambers 49 (FIG. 8) of door locking motors 50. Flexible diaphragm 62' within each motor 50 causes motor shaft 65' to move latch locks 66' and 166' to a locked condition when chamber 49 of the motor 50 is subjected to engine intake manifold vacuum. Whenever chamber 49 is evacuated in the above manner, motor chamber 62 remains vented through conduits 63 (FIGS. 8 and 1), 63A, 64, chamber 65 of valve 41 (FIG. 4), valve conduit 66 (because valve 67 is on its lower seat), chamber 70, conduit 71, filter 72, and port 73. This venting permits unrestricted downward deflection of diaphragm 62' by vacuum in chamber 49.

The downward deflection of diaphragm 62' of door locking motors 50 causes the locking of latch locks 66' and 166'. Latch locks 66' and 166' are generally similar in construction. Locks 166', which are mounted in the rear doors, have the "selective free wheeling" feature (such as shown in Patent No. 2,849,251) for preventing unlatching of the vehicle door by the inside handle when molding button 70' is depressed. Latch lock 66' operates in the following manner: A bell crank lever 67' is pivotally mounted on housing 68' by pin 69'. The shaft 71' of a conventional manual door locking and unlocking pin 70' extends through the molding (not shown) of the vehicle door. Shaft 71' is fastened to one end of bell crank lever 76' (FIGS. 8 and 9) which is adapted to pivot about pin 77'', the other end of lever 76' fitting within notched recess 78' within link 72'. Link 72' is pivotally mounted on pin 73' which extends from flange 74' positioned at a right angle to plate 75' of housing 68'. As can be seen from FIG. 9, when shaft 71' is depressed, link 76' will pivot in a clockwise direction, and link 72' will pivot in a counterclockwise direction about its pivot pin 73' to cause the portion 78'' of link 72' to move downwardly and carry prong 79' of link 80' (FIG. 8) downwardly with it, prong 79' fitting within the slotted portion 81' of part 78'' of link 72' (FIG. 8). It will be noted that a snap spring 82' (FIG. 9) has one end 83' anchored on flange 74' and the other end 84' anchored in link 72'. Thus, when manual locking pin 70' is depressed to a locked condition (either manually or by the action of motor 50), it is the snap spring 82' which maintains link 72' in a locked position.

Shaft 65' of fluid pressure motor 60' is coupled to shaft 85' (FIGS. 8 and 9) which is, in turn, coupled to bell crank lever 76'. Thus the downward movement of shaft 65' in response to the existence of vacuum in locking chamber 49 of fluid pressure motor 50 will cause a downward movement of shaft 85' which, in turn, will cause a downward movement of the leg of bell crank lever 76' to which shaft 85' is attached to thereby pivot link 72' to the position shown in FIGS. 8 and 9.

After link 80' has been pivoted in a clockwise direction about pin 86' in the above-described manner, the movement of pin 87' to the right, as occurs when the outside door handle (not shown) is manipulated, will cause lever 80'' to pivot clockwise about pin 81'' and cause link 80' (attached to lever 80'' by pin 86') to move to the right in FIG. 2. However, the end 88' of link 80' will not engage flange 89' of bell crank lever 67'. Thus, the manipulation of the outside door handle will be ineffective for unlocking the door lock because the movement of link 80' will not cause lever 67' to pivot in a clockwise direction to free latch 99', as described in greater detail immediately hereafter.

It is only after link 80' has been pivoted about pin 86' in a counterclockwise direction from its position shown in FIG. 8 that the end 88' thereof may engage flange 89' when the outside door handle is manipulated. When end 88' of link 80' abuts flange 89' of bell crank lever 67' in response to the movement of pin 87' to the right during a door unlatching operation, lever 67' will pivot in a clockwise direction about pin 69', and the leg 90' (of lever 67') which is within the recessed portion 91' of lever 92' will cause the latter to pivot in a counterclockwise direction about its pivot pin 93' against the bias of spring 94'. This, in turn, will cause the tongue 95' of lever 92' to cease engagement with ratchet wheel 97' which is, in turn, coaxially mounted on shaft 98' with the rotary door latch 99'. When the above-described locking arrangement for the rotary door latch 99' is released through the operation of the above-described linkage, latch 99' is free to move relative to the striker plate (not shown) on the door jamb to permit the vehicle door to be pulled to an open position.

As set forth above, it can readily be seen that whenever the vehicle engine is in operation (while the vehicle drive selector valve 24 and seat valve 33 permit communication between the engine intake manifold and central distributor valve 41), the existence of vacuum in chamber 49 of each fluid pressure motor 50 will cause downward deflection of diaphragm 62' to place the door latch lock mechanisms 66'—166' in a locked condition. It is to be especially noted that since vacuum is maintained in chamber 49 at all times while the vehicle engine is in operation, that a downward force is produced on motor shaft 65' which will at all times oppose any upward force exerted on said shaft by manual manipulation of manual locking pin 70'. Therefore, it can readily be seen that any attempt to unlock the latch locks from within the vehicle will be presented by the door locking motor 50 whenever the engine is in operation. Preferably this mode of operation is limited only to the rear doors to prevent passengers, such as children, from unlocking and opening the doors while the vehicle is in motion. Therefore, the locks in the rear doors may be of the type disclosed in Patent No. 2,849,251 wherein the manipulation of the door handle will be ineffective for unlocking the door when the locking pin (such as 70') is depressed. With rear door locks such as shown in Patent No. 2,849,251, the motors 50 may be coupled directly to the door locking pins 70' which protrude from the rear door moldings. It is to be noted, however, that latch locks 66', described above, permit the doors to be unlocked by the use of a door handle even if pins 70' are depressed, as described in detail hereafter.

Whenever the vehicle engine ceases operation, all of the door latch locks 66'—166' will remain in a locked condition which will prevent the doors from being opened from outside of the vehicle. This result is achieved because spring 82' (FIG. 9) which links flange 74' to lever 72' has an overcenter type of action whereby it retains the latch lock either in a locked or an unlocked condition depending upon the position to which it was last actuated. Thus, after the vehicle has been parked and the engine has been turned off, the only doors which need be relocked after occupants have left the vehicle are those which were actually opened during the process of leaving the vehicle.

The present invention also contains provisions for locking and unlocking the door locks 66'—166' from a remote position. To this end, a manual control valve 104 (FIGS. 1 and 7) is provided. This valve may be mounted either on the vehicle dashboard or on the vehicle door, as desired. It will be noted that the remote manual locking and unlocking of the vehicle doors takes precedence over any other factors influencing the door locks. When it is desired to lock the vehicle doors from a remote position, knob 105 of valve 104 is pivoted in a clockwise direction about pin 106 (FIG. 7). This will cause the right portion of knob 105 to depress valve stem 107 having valve 108 on the end thereof against the bias of spring 109 which is interposed between the valve housing and valve 108. As can be seen from FIGS. 1, 3, 3A, 3B, and 11, vacuum tank 17 is in communication with nipple 110 of valve 41 through conduit 111. Nipple 110, in turn, is in communication with conduit 112 (FIGS. 2, 3, 3A, 3B, and 4) which extends both within the housing of valve 41 and outside thereof, the latter being shown in FIG. 2. Conduit 113 (FIGS. 1, 2, and 7) couples conduit 112 to port 114 within valve 104 (FIG. 7) which, in turn, is in communication with chamber 115 within the valve. Whenever knob 105 is pivoted in a clockwise direction as discussed above, chamber 115 of valve 104 will be in communication with conduit 116 through conduit 117' and chamber 108' of the valve. Conduit 116, in turn, is in communication with the upper portion of valve 41 as can be seen from FIGS. 1, 2, 3, 3A, and 3B. The foregoing movement of knob 105 will cause evacuation of chamber 117 of valve 41 through conduit 116 and the conduits in communication therewith which lead to vacuum tank 17. When chamber 117 (FIGS. 3, 3A, and 3B) is evacuated in the foregoing manner, flexible diaphragm 118 will be moved upwardly against the bias of spring 119 from its position shown in FIGS. 3 and 3A to its position shown in FIG. 3B. This will cause a corresponding upward movement of valve stem 120 having a disc extension 122 resting on top of diaphragm 118 and having a double-ended poppet valve 121 at one end thereof. The upward movement of valve 121 from its seat 123 (FIG. 3A) to its seat 124 (FIG. 3B) will permit vacuum in tank 17 to be in communication with locking chamber 49 (FIG. 8) of motor 50 through conduit 111, nipple 110, conduit 112 in valve 41, valve chamber 125, conduits 57, 56, 55, 54, 53, conduit 52 (FIGS. 3B and 1), and conduit 51. In this respect it will be noted that poppet valve 46' is in the position shown in FIG. 3B whenever the engine is not in operation, thereby permitting communication between valve conduits 54 and 53. On the other hand, if the vehicle engine should be in operation and the positioning of valve 46' on its seat 48 will prevent the above-described communication, the manifold vacuum will already be in communication with the locking chambers 49 of the door locking motors and there will therefore be no need for placing tank vacuum in communication with the motors for locking them. It will readily be appreciated that whenever vacuum is applied to chamber 49 of motor 50 in the above-described manner, chamber 62 will be vented to the atmosphere, as described in detail above. It can thus be seen that the door locks may be actuated simultaneously to a locked condition from a remote position by manipulation of knob 105.

In accordance with the present invention, an arrangement is provided for insuring that the momentary actuation of valve 104 results in positive locking of all of the vehicle door locks. In this respect, a chamber 118' (FIGS. 3, 3A, and 3B) is provided in valve 41. This chamber is in communication with valve chamber 117 through conduit 119'. An adjustable bleed screw 120' is threadably positioned in the housing of control valve 41 so that the rate of air bleed from the atmosphere to chambers 118' and 117 through aperture 121', filter 122', and aperture 123' may be adjusted. It can readily be seen that when knob 105 of valve 104 is actuated in the above-described manner to effect manual remote locking of the door locks, chambers 117 and 118' will be evacuated prior to the actuation of valve 121 in the above-described manner. However, since chamber 118' in essence provides an additional volume to chamber 117, the controlled rate of air flow back into the evacuated chambers from the atmosphere will take longer than if chamber 17 was used alone. The purpose for having a lengthened controlled rate of bleed to chambers 117 and 118' from the atmosphere through the above-described path is to cause valve 121 to remain open for a sufficiently long time to insure adequate communication between the vacuum source and the door locking motors to effect a proper door locking operation, notwithstanding that the actuation of knob 105 may be only momentary.

Many times it is desirable to unlock the vehicle doors from a remote position for the purpose of permitting passengers to enter or leave the vehicle. This is effected by the use of valve 104 (FIGS. 1 and 7). More specifically, in the event that it is desired to unlock all of the doors, it is merely necessary to turn knob 105 of valve 104 in a counterclockwise direction about its pivot 106 This causes valve 126 mounted on stem 127 to be moved downwardly against the bias of spring 128 to permit communication between conduit 113 (which is in communication with tank 17) and conduit 130 (FIGS. 1, 2, and 4) through chamber 115, valve conduit 131 and valve chamber 132. This placing of conduit 130 under vacuum will cause evacuation of valve chamber 133 (FIG. 4) which, in turn, will result in the upward deflection of diaphragm 134 against the bias of spring 135. The upward movement of diaphragm 134 is accompanied by an upward movement of double-ended poppet valve 67 from its lower seat 68 to its upper seat 69 because valve 67 is mounted on valve stem 136 which has the upper end thereof formed into a dished member which rests on top of diaphragm 134. The movement of valve 67 away from its seat 68 permits communication of conduit 112 (which is in communication with conduit 111 leading from the vacuum tank FIGS. 1, 3, and 11) and conduit 64 through valve chamber 65. Conduit 64, in turn, is in communication with conduits 63A which are in communication with conduits 63 leading to chambers 62 (FIG. 8) of motors 50. The existence of vacuum within chamber 62 of door locking motor 50 will cause an upward deflection of diaphragm 62' and thereby result in the upward movement of shaft 65' which is attached to diaphragm 62' to cause the latch lock mechanisms 66' and 166' to be placed in an unlocked condition, as described in detail above.

It will, of course, be appreciated that if the vehicle engine is in operation when the valve 104 is manipulated in the above-described manner, the vacuum from the engine intake manifold in lockng chamber 49 of motor 50 will have to be nullified to permit unlocking of the latch lock. This is achieved in the following manner: chamber 77' of valve 41 is in communication with chamber 133 (FIG. 4) through valve conduits 137, 138, and 139. Therefore, since chamber 133 is under vacuum, chamber 77' will also be under vacuum. In the event that the engine is in operation, chamber 77 above diaphragm 43 of valve 41 (FIG. 4) will also be under vacuum. However, the tank vacuum always has to be at least as great as the engine intake manifold vacuum while the engine is in operation, and therefore there will be equal vacuum applied to both chambers 77 and 77'. The vacuum forces tending to deflect diaphragm 43 are therefore neutralized and spring 42, which bears downwardly on diaphragm 43, causes valve 46' to move away from its seat 48 and valve 46 to move onto its seat 47. This will shut off communication between the vacuum in chamber 77 and chamber 49 of door locking motor 50 and substantially simultaneously permit conduit 52 which ultimately communicates with chamber 49 to be vented to the atmosphere through the above-described path as set forth relative to FIGS. 3, 3A, and 3B. Furthermore, as described above relative to FIG. 3, the closing and opening by valves 46 and 46', respectively, is achieved sequentially because they are movable on the valve stem 45 and have spring 47' therebetween. This sequential opening and closing prevents cross-porting between chamber 77 and conduit 54. It can thus be seen that valve 104 may be used to selectively unlock the vehicle doors even though the door locking motors are being subjected to manifold vacuum.

When knob 105 (FIG. 7) of valve 104 is released, it will return to a neutral position whereby it terminates communication between vacuum tank 17 and certain of the operating portions of valve 41. More specifically, when knob 105 is released, chamber 133 of valve 41 (FIG. 4) will be vented to the atmosphere through aperture 100, filter 102, conduit 101, chamber 77', and conduits 139, 138, and 137. However, bleed screw 103 controls the rate at which air enters chamber 77' and chamber 133. This bleed screw, which is adjustable, is set so as to permit valves 46 and 67 to be retained in their FIG. 4 position for a few seconds interval before the controlled venting through apertures 100 and 101 permits spring 135 to return valve 67 to its lower seat and permits the vacuum in chamber 77 to return valves 46 and 46' to the position shown in FIG. 3A. When the vehicle engine is in operation, the vacuum produced in the intake manifold will cause the evacuation of chamber 77 of valve 41 to automatically relock all of the vehicle doors after the few seconds interval. The purpose of a few seconds delay is to remove the locking force exerted by the motors on all the door locks for a few seconds interval notwithstanding that the operator has actuated the manual unlock control knob 105 only momentarily, thereby permitting a passenger to open any of the doors before the locking arrangement effects automatic relocking of the doors.

It will readily be appreciated that the above-described manual locking and unlocking of the vehicle door locks may be effected whether the vehicle engine is in operation or not because the vacuum tank 17 is always evacuated to a sufficient degree to permit the remote actuation of the door locking motors. More specifically, whenever the vehicle engine is not in operation, the actuation of knob 105 (FIG. 7) of valve 104 in a counterclockwise direction will cause communication between vacuum tank 17 and unlocking chamber 62 of motor 50 (FIG. 8) through the path described above. Under these circumstances it will be noted, however, that there is no vacuum in chamber 77 of valve 41 and the evacuation of chamber 77' serves no functional purpose.

It is to be noted that locks 66', which are preferably mounted only in the front doors of the vehicle, as discussed above, may be unlocked against the locking force exerted by motors 50. Thus the manipulation of handle 150 to move link 151 to the right in FIG. 1 will cause the upper end 112' of lever 108' (FIG. 8) to pivot into the plane of the drawing about pin 109'. The upper end 112' of lever 108, in turn, is hooked around tip 111' of bell crank lever 67'. Therefore, the above-described pivotal action of lever 108 will cause a clockwise pivoting of lever 67', and the leg 90' thereof will pivot lever 92' out of engagement with ratchet 97' to permit the door to be opened. When lever 92' is pivoted counterclockwise about pin 93', the tip 92'' of lever 92' will engage the underside of link 80' and move it to a position which will permit the opening of the vehicle door.

If the operator leaves the vehicle, it is desirable that the door lock 66' remain in the unlocked position, as described above, in order to prevent his being locked out of the vehicle. In order to insure this, a venting arrangement is provided in seat valve 33 (FIG. 6). Whenever the operator leaves the seat and valve element 36 returns to its seat 36' under the urge of spring 35, shoulder 35' on stem 38 moves valve 33' away from its seat 32'. Therefore, conduit 39, which leads to chamber 77 (FIG. 3) of valve 41, will be vented through filter 140, conduit 38', bore 37' and nipple 37 to prevent vacuum, which may be trapped in conduit 39 in the absence of the venting arrangement, from maintaining chamber 49 of motor 50 under vacuum to cause the latch locking of lock 66' after the operator has left the vehicle.

If the operator remains in the vehicle and a passenger opens the front door in the manner described above, the vacuum in line 39 will be sufficient to cause the door to relock, even if the engine is off. In this manner, locking of the doors against entry is assured as long as the operator remains in the vehicle.

As noted above, front door latch locks 66' may be opened by the manipulation of handles 150 whether pins 70' are in a locking or an unlocking position. Furthermore, as noted above, rear door locks 166' are of the type which cannot be opened by the manipulation of handles 165 when rear door pins 70' are depressed. In this respect, each rear latch lock 166' is coupled to a handle 165 by link 167, and each rear door locking pin 70' is coupled to lock 166' through bell crank lever 168 and link 169. As noted above, locks 166' may be of the type disclosed in Patent Number 2,849,251. The leverage of the links extending between rear door pins 70 and rear door locking motors 50 is such that rear pins 70' cannot be lifted to unlock the rear doors as long as motors 50 are subjected to vacuum, and, in accordance with the present invention, this is possible at all times that the vehicle is in operation.

Reference is now made to FIG. 11 wherein the double check valve 16 is shown which couples the intake manifold to all of the other operating components of the system. It will readily be appreciated that whenever there is a reduction in manifold vacuum, as occurs when the vehicle is accelerated, the vacuum in conduit 13 (from the manifold) will be less than the vacuum in conduit 22 leading to distributor valve 41. Spring 19 will therefore cause valve 18' to close. This has the effect of trapping vacuum in conduit 22 (and chamber 77 of valve 41, FIG. 3A) with the attendant result that the door locking motors 50 are maintained in a door locking condition when the manifold vacuum is reduced. The advantage of the foregoing type of action is that children, or other passengers, in the rear of the vehicle cannot lift pins 70' to unlock the rear doors when the intake manifold is not directly exerting a locking force on the door locking motors.

It is to be particularly noted that while check valve 18' prevents the rear doors from being actuated to an unlocked condition during a reduction in manifold vacuum, as described above, the movement of the vehicle operator from his seat when he leaves the vehicle, permits the door locking motors to be vented to the atmosphere so that the doors may be unlocked from within the vehicle to permit passengers in the rear to leave the vehicle.

In FIG. 12, a modified embodiment of valve structure which may be utilized in central distributor valve 41 is disclosed. This valve structure may be substituted for the valve structure in chambers 133 and 117 which are utilized in the manual remote locking and unlocking of the vehicle doors.

The advantage of the construction of FIG. 12 is that extremely prompt passage of fluid through the valve chamber is realized in response to manual initiation of control 104, thereby conserving vacuum in tank 17. More specifically, as noted above, valves 121 (FIG. 3) and 67 (FIG. 4) must be moved from a lower seat to an upper seat during a manual remote lock actuating operation. Valve 150' (FIG. 12) functions in the same manner and may be substituted for either or both of the above-noted valves. When vacuum is applied to conduit 151', as by placing it in communication with the vacuum tank 17, diaphragm 152' will be lifted upwardly against the bias of spring 153'. In this respect, a disc 154' is located on diaphragm 152' and the top of this disc bears on the under side of plate 155' which is pivoted to housing 156' by pin 157'. Plunger 158' has a spring 153' effectively positioned between it and the housing 156'. One end of plunger 158' bears on the upper side of plate 155'. Whenever diaphragm 152' is lifted by vacuum, the pivoting of plate 155' will cause the axis of plunger 158' to approach pin 157'. Thus, in effect, the lever arm through which plunger 158' acts, is shortened as valve 150' is raised upwardly. Thus, once there is a build-up of vacuum on the upper side of diaphragm 152', there will be an immediate snap-over action of valve 150' from its lower seat to its upper seat, because progressively less force is needed to raise diaphragm 152' once it starts upwardly. Conversely, once the vacuum to conduit 151' is terminated and air bleeds back into the chamber above diaphragm 152', the initial downward movement of diaphragm 152' will be accompanied by a pivotal counterclockwise movement of plate 155' with the resultant progressive lengthening of the effective lever arm through which the force produced by spring-biased plunger 158' acts. This will cause an immediate change-over action whereby valve 150' is moved from its upper seat to its lower seat. The downward movement of valve 150' is aided by the residual vacuum in the chamber in which valve 150' rides, because as valve 150' moves away from its upper seat, this vacuum will be applied to the under side of diaphragm 152' and the downward force thus exerted on the diaphragm will aid the foregoing snap action. Because of the foregoing mode of operation, a construction such as shown in FIG. 12 will aid materially in conserving the vacuum within vacuum tank 17 because the quick valve action permits a minimum of vacuum leakage.

While preferred embodiments of the present invention have been disclosed, it is to be understood that the present invention is not limited thereto but will be otherwise embodied within the scope of the following claims.

What is claimed is:

1. A door locking system for automatically locking the doors of a vehicle comprising a first door in said vehicle, a second door in said vehicle, first and second door opening means on the inside of said first and second doors, respectively, a first door lock in said first door, means for permitting said first door lock to be unlocked from within the vehicle by the manipulation of said first door opening means associated therewith when said first lock is in a locked condition, a second door lock in said second door, means for preventing said second door lock from being unlocked from within the vehicle by the manipulation of said second door opening means associated therewith when said second lock is in a locked condition, third door opening means associated with both said first and second doors for opening said doors from outside of said vehicle, means associated with both said first and second door locks for preventing the opening of said first and second doors by the use of said third door opening means when said locks are locked, means including motor means for selectively automatically actuating said door locks to a locked condition in response to an operational condition of the vehicle and for maintaining a holding force tending to bias said first and second door locks into a locked condition while said operational condition exists, and means for automatically maintaining said biasing force of said motor means when said operational condition ceases to exist whereby said first door may be opened from within the vehicle by the manipulation of said first door opening means whether or not said operational condition exists and whereby said second door may not be opened from within said vehicle by the manipulation of said second door opening means whether or not said operational condition exists and whereby said first and second doors are incapable of being opened from outside of said vehicle by the manipulation of said third door opening means whether or not said condition exists.

2. A door locking system for an automotive vehicle comprising a door in said vehicle, a door lock operatively associated with said door, motor means for selectively actuating said door lock to a locked condition in response to an operational condition of said vehicle, means for causing said motor means to thereafter exert a door locking force on said door lock whether or not said operational condition exists, selectively actuable control means for causing said motor means to cease exerting the locking force on said door lock and for causing said motor means to exert an unlocking force on said door lock, said control means including time delay means for causing said motor means to maintain said unlocking force on said door lock for a short interval of time after actuation thereof has terminated and thereafter permit said motor means to automatically relock said door lock in response to said operational condition.

3. A door locking system for an automotive vehicle comprising a door in said vehicle, a door lock operatively associated with said door, motor means for selectively actuating said door lock to a locked condition in response to an operational condition of said vehicle, means for causing said motor means to thereafter exert a locking force on said door lock whether or not said operational condition exists, control means adapted to be selectively actuated for causing said motor means to unlock said door lock, and time delay means for maintaining said door lock in an unlocked condition for a time interval after actuation of said control means has terminated, said motor means being adapted to return said door lock to a locked condition in response to said operational condition after said time interval has elapsed.

4. A door locking system for automatically locking a door of a vehicle against opening from both the inside and outside of said vehicle, comprising a door in said vehicle, a lock associated with said door, first door opening means on the inside of said door, second door opening means on the outside of said door, said first and second door opening means being coupled to said door lock, locking means on said door associated with both said door lock and said first door opening means for preventing said door from being opened from within the vehicle by the manipulation of said first door opening means when said locking means is in a locking condition, motor means operatively coupled to said door lock, means for selectively automatically actuating said motor means to lock said door lock in response to an operational condition of the vehicle and for causing said motor means to permanently maintain a holding force tending to bias said locking means to a locked condition whether or not said operational condition thereafter exists, means associated with said door lock and said second door opening means for preventing the opening of said door by the use of said second door opening means after said door lock has once been placed in said locked condition whether or not said motor means exerts said holding force, whereby said door having a locked door lock may not be opened from outside of said vehicle by the manipulation of said second door opening means whether or not said motor means exerts said holding force and whereby said door having a locked door lock may not be opened from inside said vehicle by the manipulation of said locking means and said first door opening means whether or not said operational condition exists, and means within said vehicle for terminating the permanent holding force exerted by said motor means to thereafter permit opening of said door from within said vehicle by the deactuation of said locking means and the manipulation of said first door opening means while the existence of said door lock in a locked condition prevents the opening of said door from the outside of said vehicle by the use of said second door opening means.

5. A door locking system as set forth in claim 4 including control means remotely positioned from said door for permitting manual remote actuation of said door locking motor to an unlocking condition.

6. A door locking system as set forth in claim 4 wherein said motor means is a fluid pressure motor and wherein said means for selectively automatically actuating said motor means to lock said door lock and for causing said motor means to permanently maintain a holding force tending to bias locking means to a locked condition includes conduit means for effecting communication between a source of fluid pressure and said fluid pressure motor, said conduit means including check valve means therein.

References Cited in the file of this patent

UNITED STATES PATENTS

| | | |
|---|---|---|
| 1,832,618 | Conklin | Nov. 17, 1931 |
| 2,340,424 | Ott | Feb. 1, 1944 |
| 2,344,826 | Le Gresley | Mar. 21, 1944 |
| 2,505,401 | Ingres et al. | Apr. 25, 1950 |
| 2,716,568 | Davies | Aug. 30, 1955 |
| 2,888,287 | Taylor | May 26, 1959 |
| 2,901,053 | Lassiter | Aug. 25, 1959 |
| 2,936,843 | Adams et al. | May 17, 1960 |